United States Patent Office 3,065,749
Patented Nov. 27, 1962

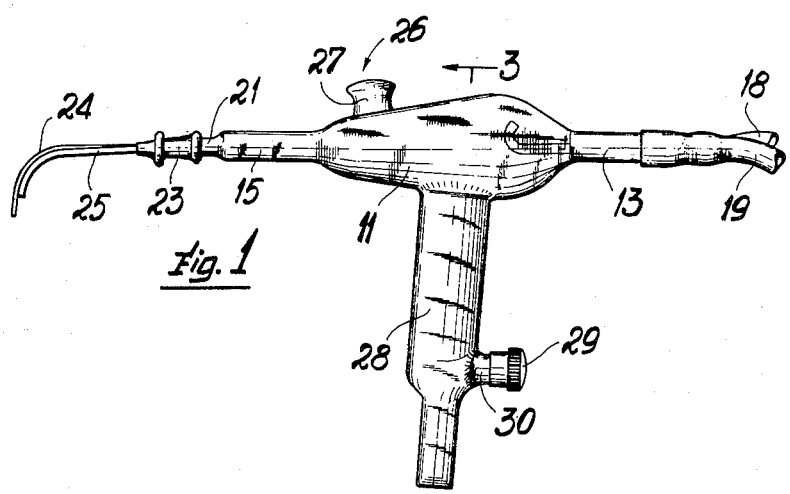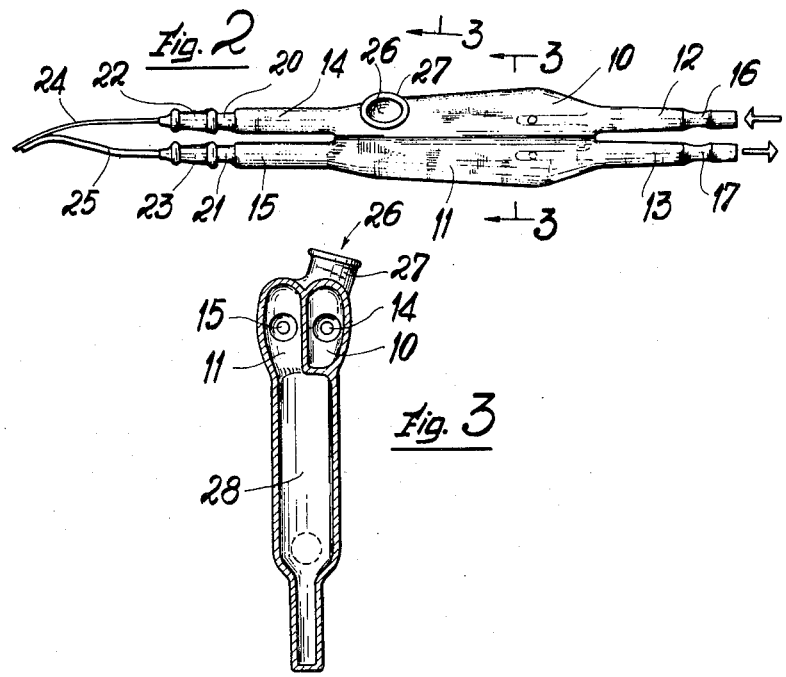

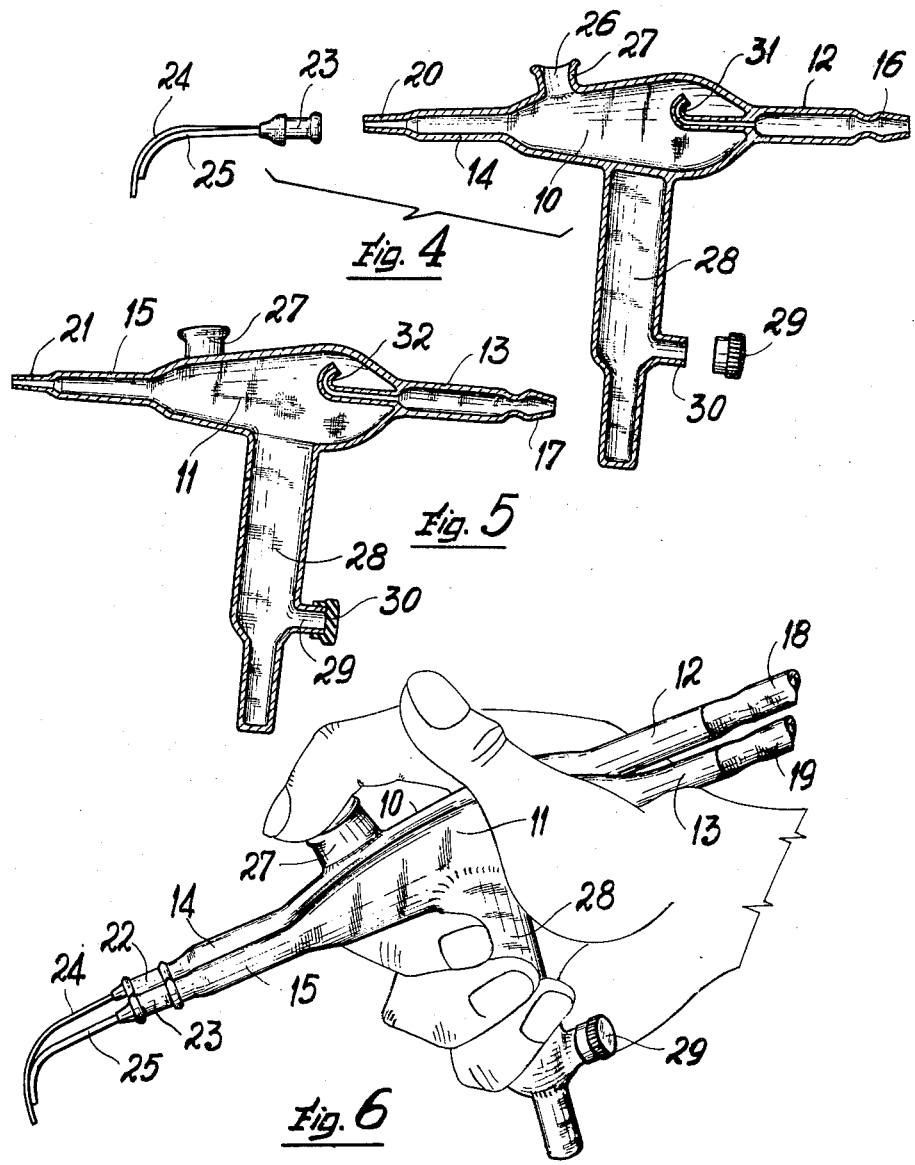

3,065,749
INJECTION AND VACUUM CLEANER FOR
DENTAL THERAPEUTICS
Michele Brass, Milan, Italy, assignor to Piorvit S.r.l.,
Milan, Italy, an Italian company
Filed May 4, 1959, Ser. No. 810,725
Claims priority, application Italy May 5, 1958
6 Claims. (Cl. 128—224)

This invention relates to means designed for performing the washing and asepsis of dental cavities and, more particularly, is related to a new and advantageous device adapted to perform an effective and complete cleaning of cavities of teeth subject to therapeutical treatment, by forcedly injecting in the cavity a proper medicinal liquid and then by vacuum removing said liquid from said cavity, together with any particle or extraneous matter which might be found in such cavity.

It is known to those skilled in the art of dental therapeutics that the care of sick teeth includes the preliminary drilling out of the cavity to remove any septic portion or matter therefrom. Such cavity might be deep and difficult to reach. A not completely cleaned and made aseptic cavity might, upon sealing and covering of the tooth, cause the occurring of pathological phenomena and lead to a new dental treatment and often to the loss of the tooth.

The current dental techniques, including the cleaning of the drilled dental cavity with a blast of air, followed by a simple rinsing of the mouth, have been often proved to be ineffective for ensuring the most desirable cleaning and asepsis of the tooth to be sealed and covered.

It is therefore an object of this invention to provide a new and advantageous device for dental therapeutics, adapted for injecting in the dental cavity a suitable medicinal liquid, via a first tubular needle shaped and supported to reach the cavity under treatment, and then for removing the said liquid therefrom, by vacuum suction exerted via a second tubular shaped needle, the device of the invention including means for connecting the said tubular needles to a source of compressed air and to a source of vacuum, respectively, means for having the feeding of the compressed air operator-controlled, means for having a medicinal liquid fed in said first tubular needle and injected therefrom, into the cavity, under the pressure of said compressed air, and means for trapping in a receptacle the liquid vacuum sucked from the cavity via said second tubular needle.

A more particular object of this invention is to provide a novel and useful device consisting of a hand operable assembly comprising a first chamber adapted to contain an amount of the said medicinal liquid and provided with means for connecting said chamber with a source of compressed air and with the said first needle, an opening in said chamber and through which the compressed air may escape for preventing the said liquid to be forced in said needle and located for having the said opening easily closed by a fingertip of the operator handling the device, for causing at will the injection of said liquid through the said first needle, a second chamber including a receptacle therebelow and wherein the vacuum-sucked liquid may collect and provided with means for connecting said second chamber to said second needle and to a source of vacuum, and trap means in said second chamber to prevent the said liquid from being sucked in said source of vacuum.

Another object of this invention is to provide a simple and readily operable device of the above character, consisting of a one-piece glass made assembly shaped for hand-grip and adapted to be activated, for example, by means of a currently manufactured and sold "aerosol" apparatus, as currently disposed by therapists, and provided with an inlet and an outlet.

Other objects and advantages of the invention are in part obvious and in part will be made apparent as this description proceeds, and the features which are considered as new and characteristic of the invention will be set forth in the appended claims.

The invention itself, however, both as to its construction and to the mode of making use thereof, will be best understood from the following detailed description of a preferred form of embodiment thereof, when read in conjunction with the accompanuying drawings, forming an essential component of this disclosure, and wherein:

FIG. 1 is a side view of the device of the invention, connected to the shaped tubular needles and to parts of pipes for connection of the device to sources of compressed air and of vacuum;

FIG. 2 is a plan view of the device of FIG. 1;

FIG. 3 is a cross-sectional view of the device, of FIG. 1, taken along the line indicated by 3—3 in FIGS. 1 and 2;

FIGS. 4 and 5 are longitudinal sectional views of the device, of FIG. 1 taken in planes traversing its first and its second chamber, respectively and FIG. 6 is a perspective view illustrating the device of the invention as being hand-grip operated.

Referring now to the drawings, wherein like reference numerals refer to like parts and components throughout the several figures, the device of the invention generally consists of a nearly symmetrically shaped one-piece glass made assembly having a middle enlarged portion including a first or pressure chamber 10 and a second or vacuum chamber 11, both having tapered fore and rear end portions. By means of tubular extensions 12 and 13, respectively, the said first and second chambers are fluidly connected at their rear portions to mouthpieces 16 and 17, respectively, adapted for connection with one end 18 and 19, respectively, of small rubber or plastic pipes the other ends of which (not shown) are supposed to be connected, during the operation of the device, with the outlet and with the inlet, respectively, of a currently produced "aerosol" apparatus (not shown) for therapy, or to another suitable source of compressed air and of vacuum, respectively.

At their fore portions, the said chambers are further fluidly connected, by means of another pair of tubular extensions 14 and 15, respectively, to regular standard sized male conical mouthpieces 20 and 21, respectively, adapted for connection with the female couplings 22 and 23, respectively, of tubular needles 24 and 25.

According to a feature of the invention, the said needles 24 and 25 are provided in pairs and soldered or otherwise connected at the end portions thereof, opposite to the coupling portions, so that such end portions are set near one another while said coupling portions are spacedly gauged for mating with said mouthpieces 20 and 21. The tubular needle 25, designed for connection with the second or vacuum chamber 11, is preferably slightly cross-sectionally larger than needle 24, and its end is slightly set back in respect to the end of said other needle 24.

The said needles 24 and 25 are curved for proper location of their free ends in the tooth cavity to be treated. In the form of embodiment of FIGS. 1, 4 and 6, the said tubular coupled needles are downwardly curved, the said needles being shaped for adaptation of the device to the treatment of cavities of lower teeth. For adapting the device to the cleaning and asepsis of upper teeth, it may be provided with correspondingly shaped but upwardly curved tubular needles (not shown).

Of course the device of the invention will be commercially produced and put on sale together with a plurality of variously shaped pairs of tubular needles, to be coupled to the device according to the various requirements of dental therapeutics.

The said first chamber 10 is further provided with an upwardly turned opening 26 formed into an upwardly protruding neck 27. At its turn, the second chamber 11 communicates with a downwardly directed receptacle 28, preferably provided with an opening arranged into a neck portion 30 and which is kept closed, during the operation of the device, by a small cap 30 made of rubber or of plastics, preferably.

The interior of the said tubular extensions 12 and 13, i.e. the duct means through which the said chambers 10 and 11, respectively, communicate with the sources of compressed air and of vacuum, respectively, communicate with said relative chambers via small upwardly bent pipes or ducts 31 (FIG. 4) and 32 (FIG. 5) respectively, designed to act as trap means preventing the liquids which may be enclosed in said chamber from flowing in the ducts connected to said pipes 18 and 19 (FIGS. 1 and 6).

As will be clearly understood by a consideration of the accompanying drawings, the whole device is shaped and constructed so that it may be easily handled by the right hand of the operator, the location of the said down-turned receptacle co-operating with the other parts of the device for proper and sure hand-grip thereof, as particularly shown in FIG. 6. In addition, the said upwardly directed opening 26 in the neck 27 is so located in respect to the other parts that, as shown in FIG. 6 too, it may be readily closed by the operator by putting a fingertip thereover.

The described device of the invention is made use of as follows:

By means of proper pipes, the said chambers 10 and 11 are connected with a source of compressed air and of vacuum, respectively. The chamber 11, communicating with the receptacle 28, is kept closed by the cap 30. A small amount of proper medicinal liquid (not shown) is poured in the chamber 10, through its opening 26 and a properly chosen pair of tubular needles 24 and 25 is fitted on the fore conical mouthpieces 20 and 21.

Upon activation of the said sources of compressed air and of vacuum, the operator grips the device and, without closing its opening 26, he handles the same until the free tips of the needle are well introduced into the tooth cavity to be cured. The suction needle 25 permanently exerts a sucking action in the cavity while liquid is still not injected through the injection needle 24, because the compressed air fed in the pressure chamber 10 freely escapes via the relatively large opening 26.

As the operator deems that the device is well positioned for treatment, upon putting his fore-fingertip on the opening 26, he causes the medicinal liquid to be forced into the injection needle 24 and therefore injected into the cavity. A plurality of brief pressures of the fore-fingertip on the opening 26 have been proved preferable for causing a corresponding plurality of small sprinkles from the tip of the injection needle 24.

In the meantime, the continuing suction action exerted at the tip of suction needle 25 causes the vacuum removal of the said liquid, and of any particle which may exist, from the tooth cavity under treatment. A few seconds treatment by means of the device of the invention has been very successfully proved as capable of ensuring the most desirable cleaning and effective asepsis of the most root-deep, thin and severely septic tooth cavity.

Upon completion of the treatment, the liquid collected in the receptacle 28 may be readily removed by removal of the cap 30.

The described device may be constructed of commercially available glass by those skilled in the manufacture of glass-made appliances for physics and chemistry. It may be easily washed and rinsed and subject to sterilization in boiling water, in alcohol, or otherwise managed as a regular medical or surgical device or appliance. The device does not comprise movable parts which might be subject to defective operation or otherwise subject to maladjustment.

There are no definite lower and upper pressure limits for air and vacuum feeding of the device. In general, the working pressure of commonly produced "aerosol" apparatus is proper for the operation of the device of the invention and, in addition, the operator may readily control the pressure causing the injection of the medicinal liquid by properly acting on the opening 26 with his fore-fingertip.

While the invention has been heretofore described and shown in one preferred form of embodiment thereof, it is not intended that the invention be limited to the very details shown or that said details should be taken as restrictive of the invention, as it is obvious that various modifications in design may be made by those skilled in the art to which this invention appertains, without departing from the spirit and the scope of the invention, as defined in and by the appended claims.

Without further analysis, the foregoing will so fully reveal the gist of this invention that others can, by applying current knowledge, readily adapt it for various applications in the dentistry and in general in therapy fields, without omitting features that, from the standpoint of prior art, fairly constitute characteristics of the invention and, therefore, such adaptations should and are intended to be comprehended within the range of equivalents thereof.

Having thus described the invention, what is claimed as new and desired to have protected by Letters Patent is:

1. Apparatus for treating tooth cavities comprising, in combination, a first chamber adapted to contain a medicinal liquid and adapted to be connected to a source of compressed gas; first conduit means connected to said first chamber and adapted to extend to a tooth cavity under treatment; opening means formed in said first chamber through which when said opening means is unobstructed compressed gas may escape so that the same does not pass through while when said opening means is closed compressed gas will pass through said first conduit means into said cavity carrying medicinal liquid from said first chamber into said cavity; a second chamber adjoining said first chamber to form a unitary device therewith and adapted to be connected to a source of vacuum; second conduit means connected to said second chamber and also adapted to extend to said tooth cavity, said first and second conduit means having openings in such close proximity of each other that the vacuum created in said second chamber will draw the medicinal liquid carried into said tooth cavity from said first chamber through said second conduit means into said second chamber; means provided in said second chamber for preventing the liquid from flowing to said source of vacuum; and removing means for removing any medicinal liquid drawn into said second chamber.

2. Appartaus for treating tooth cavities comprising, in combination, a first chamber adapted to contain a medicinal liquid and adapted to be connected to a source of compressed gas; first needle-like tubular conduit means connected to said first chamber and adapted to extend to a tooth cavity under treatment; opening means formed in said first chamber through which when said opening means is unobstructed compressed gas may escape so that the same does not pass through while when said opening means is closed compressed gas will pass through said first conduit means into said cavity carrying medicinal liquid from said first chamber into said cavity; a second chamber adjoining said first chamber to form a unitary device therewith and adapted to be connected to a source of vacuum; second needle-like tubular conduit means connected to said second chamber and also adapted to extend to said tooth cavity, said first and second conduit means having openings in such close proximity of each other that the vacuum created in said second chamber will draw the medicinal liquid carried into said tooth cavity from said first chamber through said second conduit means into said second chamber; means provided in said second chamber for preventing the liquid from flowing to said source of vacuum; and removing means connected to said second chamber for removing any medicinal liquid drawn into said second chamber.

3. Apparatus for treating tooth cavities comprising, in combination, a first chamber adapted to contain a medicinal liquid and adapted to be connected to a source of compressed gas; first needle-like tubular conduit means connected at one end to said first chamber and adapted to extend to a tooth cavity under treatment; opening means formed in said first chamber through which when said opening means is unobstructed compressed gas may escape so that the same does not pass through while when said opening means is closed compressed gas will pass through said first conduit means into said cavity carrying medicinal liquid from said first chamber into said cavity; a second chamber adjoining said first chamber to form a unitary device therewith and adapted to be connected to a source of vacuum; second needle-like tubular conduit means connected at one end to said second chamber and also adapted to extend to said tooth cavity, said first and second conduit means having openings in such close proximity of each other that the vacuum created in said second chamber will draw the medicinal liquid carried into said tooth cavity from said first chamber through said second conduit means into said second chamber, each of said first and second conduit means being curved at its other end to permit access to said tooth cavity; means provided in said second chamber for preventing the liquid from flowing to said source of vacuum; and removing means connected to said second chamber for removing any medicinal liquid drawn into said second chamber.

4. Apparatus for treating tooth cavities comprising, in combination, a first chamber adapted to contain a medicinal liquid and adapted to be connected to a source of compressed gas; first needle-like tubular conduit means connected to said first chamber and adapted to extend to a tooth cavity under treatment, manually controlled opening means formed in said first chamber through which when said opening means is unobstructed compressed gas may escape so that the same does not pass through while when said opening means is closed compressed gas will pass through said first conduit means into said cavity carrying medicinal liquid from said first chamber into said cavity; a second chamber adjoining said first chamber to form a unitary device therewith and adapted to be connected to a source of vacuum; second needle-like tubular conduit means connected to said second chamber and also adapted to extend to said tooth cavity, said first and second conduit means having openings in such close proximity of each other that the vacuum created in said second chamber will draw the medicinal liquid carried into said tooth cavity from said first chamber through said second conduit means into said second chamber; means provided in said second chamber for preventing the liquid from flowing to said source of vacuum; and removing means connected to said second chamber for removing any medicinal liquid drawn into said second chamber.

5. A device for treating tooth cavities with a medicinal liquid, comprising a liquid-receiving first chamber and a second chamber, said chambers located side by side to form a unitary device and each having a first and a second end portion, the first end portions of said first and second chambers respectively connectable to a source of compressed gas and to a source of vacuum; a pair of tubular needle-like elements connected to the second end portions of said chambers, said elements having closely adjacent free end portions for simultaneous introduction into a tooth cavity, trapping means comprising an upturned pipe in each of said chambers, said trapping means communicating with the respective first end portions, and said first chamber formed with an opening sealable by a finger while said chambers are being held by hand whereby pressure may be created in said first chamber to expel the liquid through the respective needle-like element and into the tooth cavity; and a receptacle communicating with and normally positioned below said second chamber for collecting the liquid drawn through the respective element from the tooth cavity.

6. A device for treating tooth cavities with a medicinal liquid, comprising a liquid-receiving first chamber and second chamber, said chambers located side by side to form a unitary device and each having a first and a second end portion, the first end portions of said first and second chambers respectively connectable to a source of compressed gas and to a source of vacuum; a pair of tubular needle-like elements connected to the second end portions of said chambers, said elements having closely adjacent free end portions for simultaneous introduction into a tooth cavity, said elements formed with passages communicating with the respective chambers and the cross-sectional area of the passage in the element connected with said second chamber larger than the cross-sectional area of the other element, the free end portion of the element connected with said first chamber projecting beyond the free end portion of the element connected with said second chamber; trapping means comprising an upturned pipe in each of said chambers, said trapping means communicating with the respective first end portions, and said first chamber formed with an opening sealable by a finger while said chambers are being held by hand whereby pressure may be created in said first chamber to expel the liquid through the respective needle-like element and into the tooth cavity; and a receptacle communicating with and normally positioned below said second chamber for collecting the liquid drawn through the respective element from the tooth cavity.

References Cited in the file of this patent

UNITED STATES PATENTS

| | | |
|---|---|---|
| 811,111 | Wegefarth | Jan. 30, 1906 |
| 1,266,228 | De Vilbiss | May 14, 1918 |
| 1,357,452 | Hall | Nov. 2, 1920 |
| 2,274,893 | Freedman | Mar. 3, 1942 |
| 2,449,497 | McLeod | Sept. 14, 1948 |
| 2,709,852 | Maurer | June 7, 1955 |
| 2,936,757 | Trace | May 17, 1960 |

FOREIGN PATENTS

| | | |
|---|---|---|
| 495,043 | Germany | Sept. 5, 1926 |